United States Patent
Izumi et al.

[11] 3,719,405
[45] March 6, 1973

[54] GAS BEARING

[75] Inventors: Hideki Izumi; Ryoichi Ichikawa; Hiroshi Koike; Katsuyuki Tanaka, all of Tokyo, Japan

[73] Assignee: Hitachi, Ltd., Tokyo, Japan

[22] Filed: Jan. 13, 1971

[21] Appl. No.: 106,226

[30] Foreign Application Priority Data

Jan. 21, 1970 Japan..................................45/5086

[52] U.S. Cl..................................................308/9
[51] Int. Cl................................................F16c 17/16
[58] Field of Search..............................308/122 A, 9

[56] References Cited

UNITED STATES PATENTS 3,026,150  3/1962  Buckley et al...................308/122 A Primary Examiner—Martin P. Schwadron
Assistant Examiner—Frank Susko
Attorney—Craig, Antonelli and Hill

[57] ABSTRACT

In an externally pressurized gas bearing of the type forcing gas under pressure into the clearance between a shaft and the bearing, an inlet for introducing gas under pressure is formed in one end of a nozzle body while a recessed pocket is formed in the other end and in communication with the inlet through an orifice; a bearing proper is fitted over and concentrically of the shaft with a predetermined clearance; and the nozzle body is hermetrically fitted into a nozzle body receiving hole in the bearing proper in such a way that the other end of the nozzle body may be in substantially coplanar relation with the inner surface of the bearing proper, so that the volume of the recessed pocket may be determined with ease yet with a higher degree of accuracy and thus the assembly is greatly simplified as compared with the prior art bearing.

1 Claim, 6 Drawing Figures

INVENTORS
HIDEKI IZUMI, RYOICHI ICHIKAWA,
HIROSHI KOIKE, KATSUYUKI TANAKA

BY Craig, Antonelli & Hill
ATTORNEYS

GAS BEARING

BACKGROUND OF THE INVENTION

The present invention relates to a gas bearing and more particularly an externally pressurized gas bearing.

In general, the externally pressurized gas bearing comprises a rotary shaft, a bearing proper surrounding the rotary shaft in concentrical relation therewith and with a predetermined clearance therebetween, a plurality of nozzle bodies equidistantly disposed in the bearing proper in communication with the clearance and along the circumference of the bearing proper, and means for introducing gas under pressure into the clearance. An inlet for introducing gas under pressure is formed at one end surface of the nozzle body for communication with the supply means while an orifice is formed through the other end of the nozzle body for communication with the inlet. The nozzle body is fitted through the bearing proper in such a way that the other end of the nozzle body may be radially outwardly spaced apart from the inner surface of the bearing proper, thereby defining a recessed pocket by the other end of the nozzle body and the inner wall of the nozzle receiving hole of the bearing proper.

In the externally pressurized gas bearing of the type described, the diameter of the orifice and the volume of the recessed pocket are suitably selected relative of the initial pressure of the gas under pressure supplied from the supply means so as to attain the desired bearing stiffness. It is well known to those skilled in the art that the volume of the recessed pocket of the gas bearing of the type described greatly influences the bearing stiffness as well as the stability of the gas bearing.

It is therefore necessary that care should be exercised in machining of the bearing proper and the nozzle body in order to provide the desired volume of the recessed pocket. In addition, great care must be also exercised in assembly of the nozzle bodies and the bearing proper.

SUMMARY OF THE INVENTION

It is therefore the primary object of the present invention to provide an externally pressurized gas bearing in which a plurality of nozzle bodies may be assembled with a bearing proper in a very simple manner yet with a higher degree of accuracy.

To accomplish this and other objects of the present invention, the present invention contemplates to provide a recessed pocket in communication with an orifice at the end surface of the nozzle body in opposed relation with a rotary shaft when assembled and to hold the nozzle body in such a manner that the other end thereof may be in coplanar relation with the inner surface of a bearing proper.

DESCRIPTION OF THE PREFERRED EMBODIMENT

Prior to the description of the preferred embodiment of the present invention, the prior art externally pressurized gas bearing will be described in brief for the sake of better understanding of the present invention.

Figure 1:
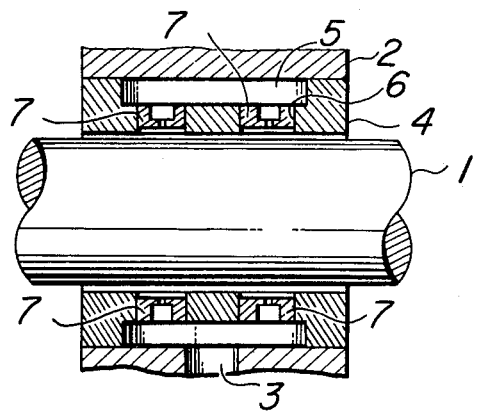
FIG. 1 is a longitudinal sectional view of the prior art externally pressurized gas bearing.
Figure 2:
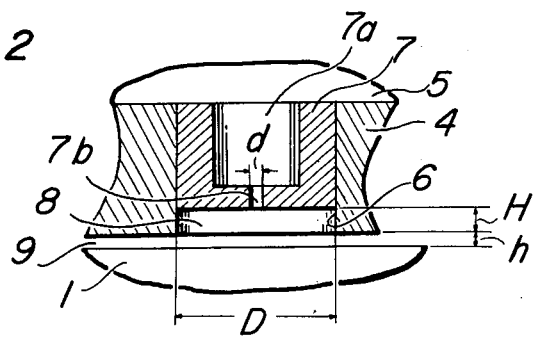
FIGS. 2 - 4 are fragmentary enlarged views thereof illustrating the nozzle body portion.

Referring to FIG. 1, reference numeral 1 designates a rotary shaft; 2, a bearing proper supporting frame having a passage 3 for supplying the gas under pressure from a source of gas under pressure (not shown); 4, a bearing proper fitted into and secured in the bearing proper supporting frame 2 and provided with an annular gas chamber 5 in communication with the passage 3 and a plurality of holes 6 for fitting therein nozzle bodies and in communication with the gas chamber 5; and 7, nozzle bodies which are best shown in FIG. 2.

The nozzle body 7 has an inlet 7a formed at one end thereof and an orifice 7b formed through the other end thereof and in communication with the inlet 7a. The nozzle body 7 is hermetically fitted into the nozzle hole 6 in such a way that the other end of the nozzle body 7 may be radially outwardly spaced apart from the inner surface of the bearing proper 4. Consequently a recessed pocket 8 is defined by the other end of the nozzle body 7 and the inner wall of the nozzle hole 6 and serves to restrict the pressure of the gas introduced through the orifice 7b within a suitable pressure. Reference numeral 9 designates a clearance between the inner surface of the bearing proper 4 and the outer surface of the rotary shaft 1.

The gas under pressure from the source (not shown) is flown through the passage 3, the gas chamber 5, the inlet 7a and the orifice 7b of the nozzle body 7 into the pocket 8 where the gas under pressure is recessed temporarily and then forced into the clearance 9 so as to form the film of gas under pressure thereby floating the rotary shaft 1 in the bearing proper 4. In the externally pressurized gas bearing of the type described, the important factors in design are the clearance $h$, the diameter D and depth H of the pocket 8 and the diameter $d$ of the orifice 7b. The most optimum diameter of the orifice 7b is dependent upon the clearance $h$ and the kinds and pressures of the gases to be employed. In general, the optimum depth H of the pocket is of the order of 0.05 – 0.3 millimeters. As to the diameter D of the pocket 8, the following relating must be satisfied so that the gas under pressure is not restricted too much at the end of the pocket 8:

$$\pi D h > \pi/4 \cdot d^2 \quad (1)$$

The larger the diameter D of the pocket 8, the better because the pressure of the gas may be maintained in the pocket 8 so as to improve the bearing stiffness. As to the depth H of the recessed pocket 8, the following relation must be satisfied so that the flow of the gas under pressure is not restricted at the discharge end of the orifice 7b to thereby reduce the bearing performance:

$$\pi \cdot d \cdot (H + h) > \pi/4 \cdot d^2 \quad (2)$$

From the foregoing description, it is seen that both of the diameter D and the depth H of the recessed pocket 8 must be increased as much as possible in order to improve the static performance of the bearing.

However, when the volume of the recessed pocket 8, that is $V = (\pi/4) D^2 (H + h)$ is increased too much, the self-oscillation or vibration called "pneumatic hammer" is produced in the rotary shaft 1 so that the diameter $D$ and depth $H$ of the recessed pocket 8 may not be increased too much from the standpoint of the dynamic performance of the bearing.

From the foregoing description, it is seen that the volume $V$ of the recessed pocket 8 of the externally pressurized gas bearing has much influence upon the both of the static and dynamic performances of the gas bearing so that much efforts have been made in order to provide a predetermined volume of the recessed pocket in assembly of the gas bearing.

Figure 3:
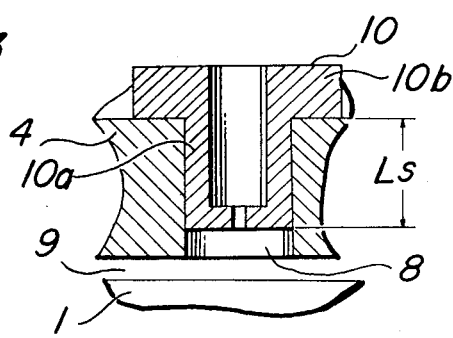
Figure 4:
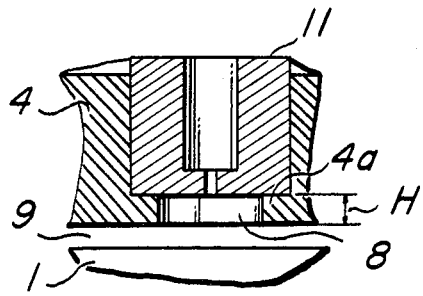

For this purpose, as viewed from FIGS. 3 and 4, there has hitherto been proposed a structure for mounting the nozzle body in such manner that the other end of the nozzle body is radially outwardly spaced apart from the inner surface of the bearing proper 4 so as to form the recessed pocket 8 as defined by the other end of the nozzle body and the inner wall of the nozzle hole. (The parts in FIGS. 3 and 4 identical to those in FIGS. 1 and 2 are designated by same reference numerals).

However, it is extremely difficult to machine within the tolerance the length $Ls$ of the tubular portion 10a of the nozzle body 10 in the gas bearing illustrated in FIG. 3 and the thickness $H$ of the nozzle receiving portion 4a of the bearing proper 4 of the gas bearing of the type illustrated in FIG. 4. More specifically, in case of the gas bearing of the type illustrated in FIG. 3, the inner surface of the flange 10b of the nozzle body 10 must be machined arcuately so as to make an intimate contact with the outer surface of the bearing proper 4 so that the bearing body 10 may be fitted into the hole by the length $Ls$ with accuracy. In case of the gas bearing shown in FIG. 4, both of the other end surface of the nozzle body 11 and the upper surface of the nozzle body receiving portion 4a must be so machined as to make intimate contact with each other. In both cases, it is extremely difficult to determine the depth of the recessed pocket with a higher degree of accuracy and with ease because of their constructions described above. The present invention is therefore directed to eliminate this problem.

Figure 5:
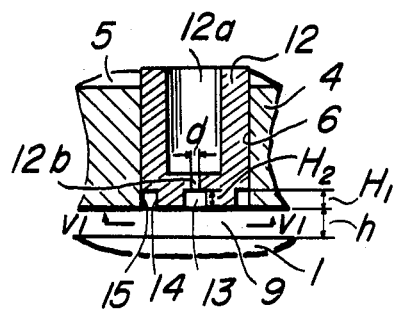
FIG. 5 is a fragmentary longitudinal sectional view of an externally pressurized gas bearing of the present invention illustrating the nozzle body portion thereof.
Figure 6:
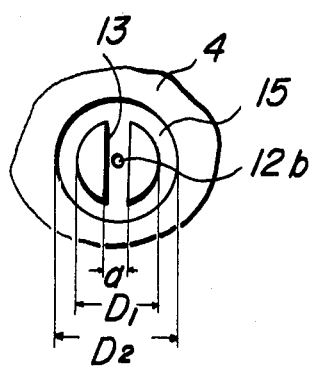
FIG. 6 is an and view looking into the direction indicated by the arrows VI — VI of FIG. 5.

Now the preferred embodiment of the present invention will be described in detail with reference to FIGS. 5 and 6 in which component parts identical to that in FIG. 1 are designated by same reference numerals. Reference numeral 12 designates a nozzle body provided with an inlet 12a for introducing the gas under pressure and an orifice 12b. On the end surface of the nozzle body 12 in opposed relation with the rotary shaft 1 are formed a groove 13 in communication with the orifice 12b and an annular notch 14 as best shown in FIG. 5. The nozzle body 12 is hermetrically fitted into the nozzle hole 6 in such a way that the end surface of the nozzle body 12 may be substantially held in coplanar relation with the inner surface of the bearing proper 4. Thus an annular groove 15 in communication with the groove 13 is defined by the annular notch 14 and the inner surface of the nozzle wall 6. This annular groove 15 and the groove 13 have the similar function as that of the recessed pocket 8 of the prior art gas bearing described above. The recessed pocket consisting of the annular groove 15 and the groove 13 in communication with the orifice 12b may be machined with a higher degree of accuracy and with ease.

As described above, the nozzle body 12 must be so fitted into the nozzle hole 6 of the bearing proper 4 as to locate the end surface of the nozzle body 12 in coplanar relation with the inner surface of the bearing proper 4. This may be accomplished in a simple manner, for example, by fitting over a round rod the bearing proper 4 so as to provide a small clearance therebetween and fitting the nozzle body 12 into the nozzle receiving hole 6 of the bearing proper 4 in such a way that its end surface may make contact with the round rod.

The gas under pressure from the source (not shown) is introduced into the pressure chamber 5 and then into the grooves 13 and the annular grooves 15 through a plurality of orifices 12b of the nozzle bodies 12 so that the pressure of the gas is restricted to a suitable pressure level in the recessed pocket consisting of the annular groove or chamber 15 and the groove 13. Thereafter the gas under pressure is discharged through the clearance 9 whereby the film of the gas under pressure is formed in the clearance 9, thereby carrying the rotary shaft 1.

As described in detail hereinabove, the gas bearing in accordance with the present invention provides a pressure pocket in the end surface of the nozzle body in opposed relation with the rotary shaft and in coplanar relation with the inner surface of the bearing proper so that the volume of the recessed pocket may be determined with a higher degree of accuracy and with ease. Thus, the assembly of the gas bearing in accordance with the present invention is greatly simplified.

What is claimed is

1. An externally pressurized gas bearing comprising
   a. a rotary shaft,
   b. a bearing proper substantially in coaxial relation with said rotary shaft for surrounding the same with a predetermined clearance therebetween,
   c. a plurality of nozzle bodies disposed in said bearing proper in angularly spaced apart relation with each other along the circumference of said rotary shaft, each of the nozzle bodies having an inlet for introducing gas under pressure formed in one end of said nozzle body, a recessed pocket formed at the other end of said nozzle body, and an orifice formed so as to intercommunicate between said inlet and said pressure pocket, said nozzle body being fitted through said bearing proper in such a way that said end of said nozzle body may be in coplanar relation with the inner surface of said bearing proper, and
   d. means for forcing gas under pressure through said nozzle bodies into said clearance between said rotary shaft and said inner surface of said bearing proper.

* * * * *